United States Patent
Gilbert et al.

(10) Patent No.: US 10,736,417 B2
(45) Date of Patent: Aug. 11, 2020

(54) SEASONAL PORTABLE LOCKER SECURITY SYSTEMS

(71) Applicant: Crate Systems, LLC, High Point, NC (US)

(72) Inventors: Ryan Andrew Gilbert, Solana Beach, CA (US); Edward Blake Mosher, Austin, TX (US)

(73) Assignee: Crate Systems, LLC, High Point, NC (US)

(*) Notice: Subject to any disclaimer, the term of this patent is extended or adjusted under 35 U.S.C. 154(b) by 0 days.

(21) Appl. No.: 16/156,847

(22) Filed: Oct. 10, 2018

(65) Prior Publication Data

US 2020/0054128 A1    Feb. 20, 2020

Related U.S. Application Data

(60) Provisional application No. 62/718,704, filed on Aug. 14, 2018.

(51) Int. Cl.
| | |
|---|---|
| *A47B 61/06* | (2006.01) |
| *B62B 3/00* | (2006.01) |
| *B62B 3/10* | (2006.01) |
| *B60R 25/33* | (2013.01) |
| *B60R 25/104* | (2013.01) |
| *B60R 25/30* | (2013.01) |
| *B60R 25/10* | (2013.01) |

(52) U.S. Cl.
CPC ............ *A47B 61/06* (2013.01); *B60R 25/104* (2013.01); *B60R 25/305* (2013.01); *B60R 25/33* (2013.01); *B62B 3/005* (2013.01); *B62B 3/10* (2013.01); *B60R 2025/1013* (2013.01)

(58) Field of Classification Search
CPC .... B65D 81/3813; B65D 81/18; B65D 81/24; B65D 21/0201; B65D 25/04; B65D 90/0006; A47B 61/00–61/06
USPC ........................................................ 340/426.1
See application file for complete search history.

(56) References Cited

U.S. PATENT DOCUMENTS

| | | | | |
|---|---|---|---|---|
| 2,980,438 A * | 4/1961 | Baer | ................... | B62B 3/10 |
| | | | | 280/79.3 |
| 3,722,905 A * | 3/1973 | Solomon | ................... | B62B 3/02 |
| | | | | 280/39 |
| 5,636,750 A * | 6/1997 | Heyl | ................... | A47B 53/02 |
| | | | | 211/1.57 |
| 5,718,490 A * | 2/1998 | Liao | ................... | A47B 43/04 |
| | | | | 135/157 |
| 7,484,631 B2 * | 2/2009 | Bothun | ................... | A47B 53/02 |
| | | | | 211/162 |
| 7,963,531 B2 * | 6/2011 | Panigot | ................... | A47C 1/143 |
| | | | | 280/38 |
| 7,963,533 B2 * | 6/2011 | Bothun | ................... | A47F 9/00 |
| | | | | 211/2 |
| 9,864,885 B2 * | 1/2018 | Rinehart | ................... | G06K 7/10366 |
| 2003/0218307 A1 * | 11/2003 | Anderson | ................... | B62B 3/006 |
| | | | | 280/79.2 |

(Continued)

*Primary Examiner* — Eric Blount

(57) ABSTRACT

Methods and systems are presented to transport and store personal cargo in a secure seasonal portable closet or similar large portable locker configured to roll through a standard domestic doorway. Such lockers may be configured with several posts, wheels supporting one or more frames, and a sleeve assembly or other security covering supported by the posts.

14 Claims, 5 Drawing Sheets

(56) References Cited

U.S. PATENT DOCUMENTS

| | | | |
|---|---|---|---|
| 2004/0000766 A1* | 1/2004 | Ekstein | B62B 3/003 |
| | | | 280/47.34 |
| 2004/0002869 A1* | 1/2004 | Ekstein | G06Q 10/08 |
| | | | 705/26.1 |
| 2004/0163327 A1* | 8/2004 | Cash | A47B 51/00 |
| | | | 52/27 |

* cited by examiner

SEASONAL PORTABLE LOCKER SECURITY SYSTEMS

CROSS-REFERENCE TO RELATED APPLICATIONS

This application claims the benefit of U.S. Provisional Application No. 62/718,704 (entitled "NOVEL STRUCTURE AND APPLICATION OF A CRATE USED FOR THE TRANSPORTATION OF OBJECTS" and filed 14 Aug. 2018) which is incorporated by reference in its entirety for all purposes.

DESCRIPTION

Figure 1:
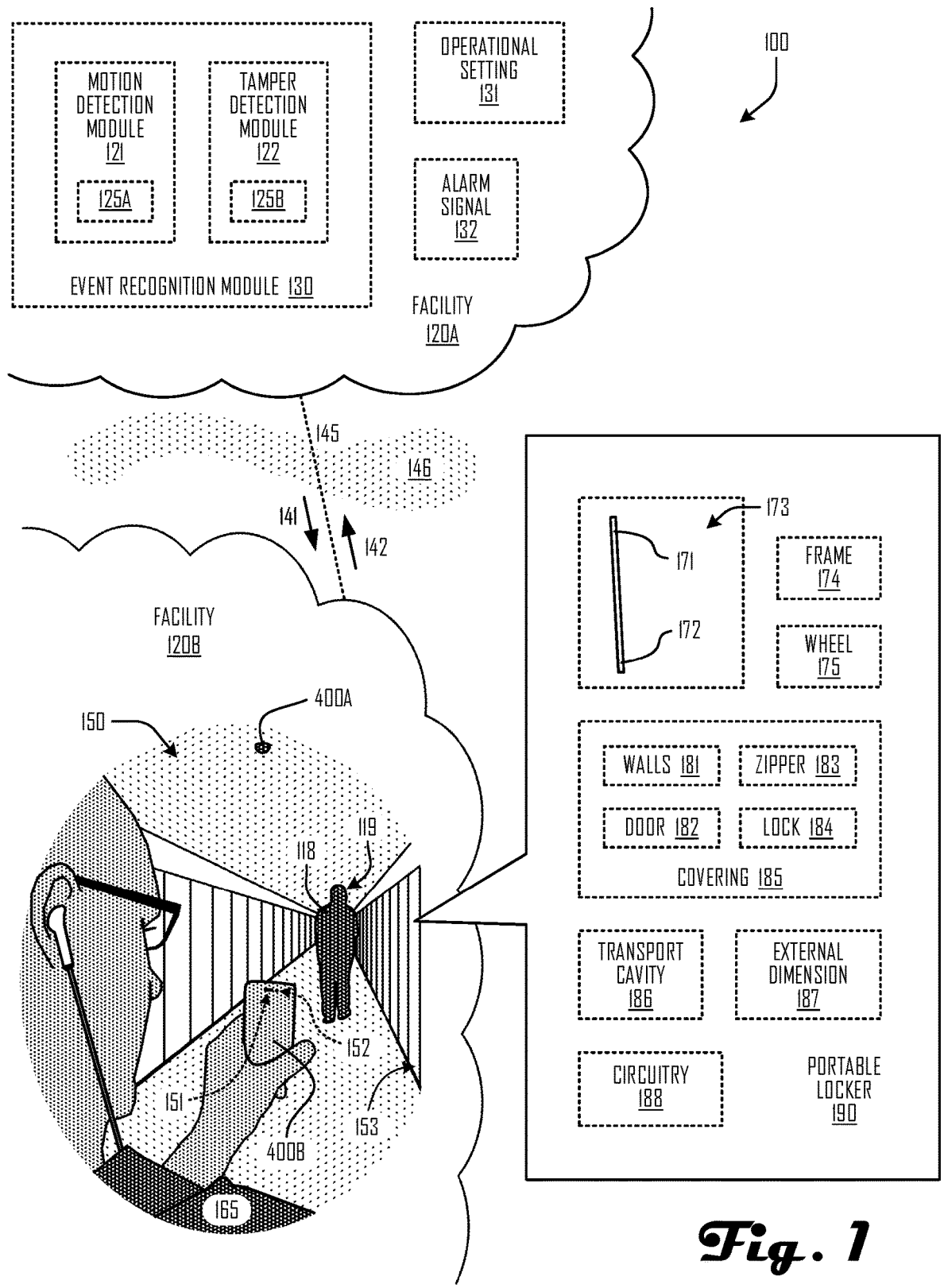
FIG. 1 illustrates a secure seasonal storage system configured to store cargo belonging to multiple individuals in which one or more technologies may be implemented.

The phrases "in one embodiment," "in various embodiments," "in some embodiments," and the like are used repeatedly. Such phrases do not necessarily refer to the same embodiment. The terms "comprising," "having," and "including" are synonymous, unless the context dictates otherwise.

"Aboard," "additional," "adjacent," "adjusted," "alternatively," "arranged," "authorized," "automatic," "back," "before," "both," "central," "closable," "comprising," "conditional," "configured," "covered," "cubic," "distal," "domestic," "during," "end," "extending," "flexible," "folded," "fourth," "global," "hanging," "historical," "inward," "irregularity-indicative," "large," "limited," "lockable," "more," "moved," "narrow," "offsite," "onsite," "open," "outward," "over," "overlapping," "portable," "possible," "primary," "projecting," "protective," "quickly," "real time," "remaining," "retracted," "revealed," "seasonal," "separate," "single," "stable," "synthetic," "therethrough," "through," "top," "under," "visible," "visual," "wherein," "while," "wide," "wireless," "within," "without," "wrapped," or other such descriptors herein are used in their normal yes-or-no sense, not merely as terms of degree, unless context dictates otherwise. In light of the present disclosure those skilled in the art will understand from context what is meant by "configured" or "enough" and by other such relational descriptors used herein.

A "secure portable locker" as used herein is different from any conventional luggage or shelving. Instead it refers to any large narrow rolling wardrobe or similar cart having one or more openable and lockable transport cavities. As used herein "large" means more voluminous than one cubic meter. As used herein "narrow" means having a horizontal dimension small enough to pass through a standard domestic doorway (i.e. less than one meter). "Standard" domestic doorways vary by region but all are wider than 85 centimeters and at most about one meter for present purposes.

Reference is now made in detail to the description of the embodiments as illustrated in the drawings. While embodiments are described in connection with the drawings and related descriptions, there is no intent to limit the scope to the embodiments disclosed herein. On the contrary, the intent is to cover all alternatives, modifications and equivalents. In alternate embodiments, additional devices, or combinations of illustrated devices, may be added to, or combined, without limiting the scope to the embodiments disclosed herein.

FIG. 1 depicts a secure seasonal storage system 100 configured securely to store cargo belonging to multiple individuals. In a local storage facility 120B where such cargo is kept, numerous (i.e. a dozen or more) large portable lockers 190 may each be configured so as to provide camouflage to one another by being visually similar (e.g. not having conspicuously different colors, patterns, identifiers, or other features people might easily notice). In a common hallway or other semi-secure area as shown, for example, numerous lockers may be aligned serially (front-to-back or back-to-back, for example) so that an end wall 153 of each may be seen simultaneously by a wandering guard or other onsite personnel 165. Each such portable locker 190 may (optionally) include one or more instances of diagonal or other rigid posts 173 supported by one or more frames 174 and wheels 175 as exemplified below. Each may (optionally) also include one or more security coverings 185 that contain and protect user cargo in spacious transport cavities 186 while providing external dimensions 187 narrow enough to roll through a standard doorway. Such coverings 185 may (optionally) include one or more other walls 181, doors 182, zippers 183, locks 184, hinges, or combinations of these. Moreover in some variants special-purpose transmitters or other sensor-containing circuitry 188 may be placed surreptitiously aboard some of the portable lockers and configured to work in conjunction (via radio frequency or other wireless linkages 145 across free space media 146, e.g.) with fixed-mount or portable local devices 400A-B nearby (i.e. in a vicinity 150) enough to obtain photographic or other data 125A-B from or otherwise depicting portable lockers 190 or visitors 188 accessing them. As further described below, such data may be sent as output 142 to a facility 120. And alarm signals 132 or other real time responses may likewise be received as input 141 from a facility 120 where such processing/determinations are made, in respective embodiments. "Real time" is used herein to refer to responsive indications that occur less than one minute (and often less than one second) after a photograph or other raw sensor data 125 depicting a visitor 118 or portable locker 190 is captured.

Figure 5:
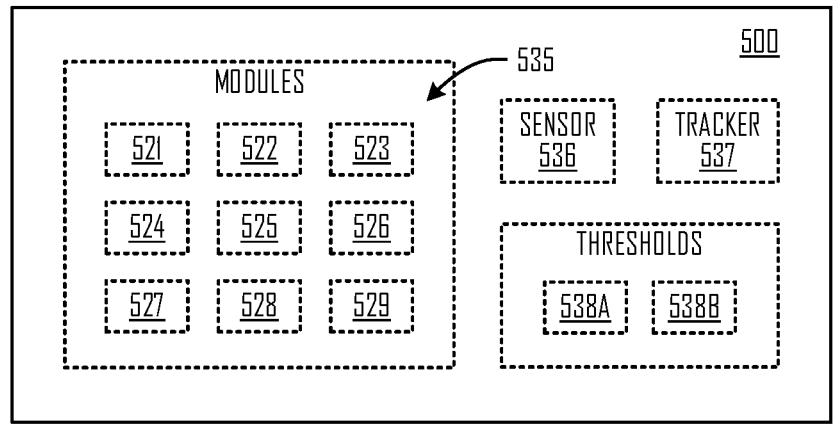
FIG. 5 illustrates event-sequencing logic configured to facilitate security in which one or more technologies may be implemented.

In some variants a microphone 151 or camera 152 in such devices 400 or in circuitry 188 aboard a portable locker 190 (or both) may be configured to capture a voice, face 119 or other biometric attribute of a visitor 118 so that such raw data can be selectively recorded or otherwise acted upon in real time. In some variants pattern or event recognition modules (see FIG. 5) remote from the first secure seasonal portable locker 190 may be configured to generate an irregularity-indicative conditional notification (e.g. to police or onsite personnel 165) or other input 141 via local hardware. Such input 141 may manifest a result of a comparison between an indication identifying a prior user/visitor with an indication identifying a current-day user/visitor and conditionally indicate an apparent mismatch, for example, in some variants.

Biometric or other identifying data 125 may (optionally) be used to provide to one or more event recognition modules 130 in a cloud server or remote server (at a central facility 120A, for example). An event recognition module 130 may (optionally) be configured to use such information in determining whether a visitor 118 currently onsite is recognized in a good way (e.g. as a current renter or owner) or otherwise in real time, for example. This can occur, for example, in a context in which one or more up-to-date motion detection modules 121 are configured to trigger facial or gesture recognition upon current sensor data 125A from onsite cameras 152 or the like; in which such data processing results in an alarm signals 132 or other conditional notifications in real time (e.g. indicating a visitor 118 wanted for burglary); and in which other current data indicates a status of security personnel 165 (e.g. available or not) or other identified responsive measures (e.g. locking down the local facility 120B to give personnel more time to arrive) previously identified as a programmatic response to current-day sensor data 125A-B. In some variants, for example, an audible or other alarm signal 132 may describe a location of a specific portable locker 190, for example, such as with GPS coordinates, a facility name, or a floor number (or a combination of these). Such alarm signals 132 may include a Short Message Service (SMS) text, for example, saying something like "Hmmm, someone is moving a lot of lockers on the fourth floor" or "Help! Someone seems to have damaged a locker on the fourth floor!" (with a street address if going offsite, for example).

In the interest of ongoing improvement, one or more tamper detection modules 122 or other event recognition modules 130 (configured to process sensor data 125B) may be configured to implement a latest version of an evolving response protocol (e.g. using facility-specific and in some contexts cargo-owner-defined operational settings) applicable for each local facility 120B (and in some contexts for each owner of cargo) or in each portable locker 190. Although some experimentation is expected in accommodating new storage technology in various cost-effective facilities 120B of intermediate security (i.e. where numerous portable lockers 190 are each locked but generally not always supervised), such experimentation is not undue. Some alarm signals 132 may be silent (in an effort to allow personnel 165 to move in, for example), and others may not (where a loud alarm is conditionally sounded in lieu of human action, for example). In some contexts an operational setting 131 by each cargo owner is used in deciding among two or more available protocols (e.g. with protocol names like "don't bother me," "just send me the pics," "grab the perp!", "my peeps will visit often," or "only break-ins interest me") that will thereafter be in effect for each particular portable locker 190, as further described below.

Figure 2:
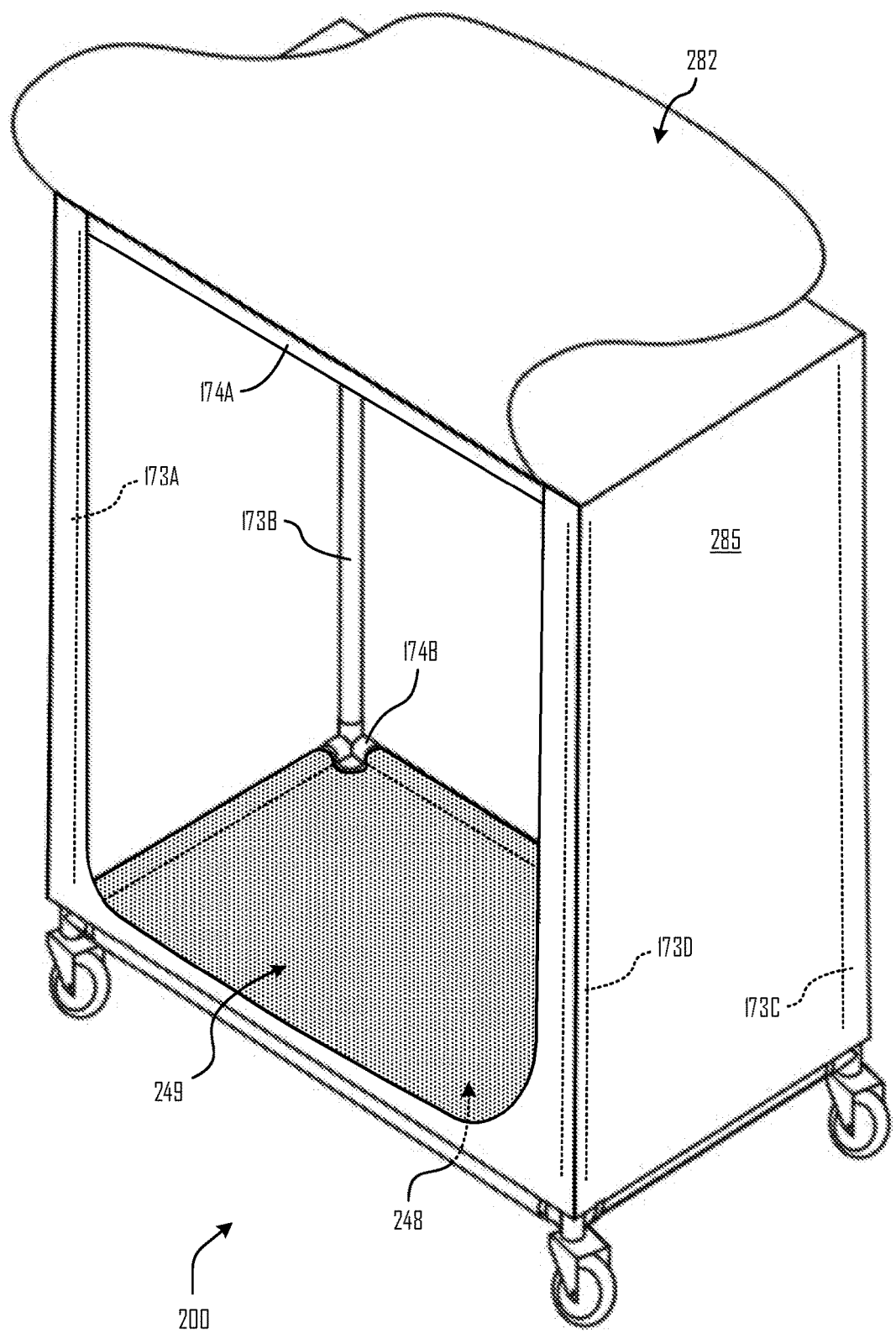
FIG. 2 illustrates a secure seasonal storage system configured to transport and store cargo in which one or more technologies may be implemented.

Referring now to FIG. 2, there is shown another secure seasonal storage system 200 in which (an instance of) a portable locker 190 is configured as a secure seasonal portable closet. A "secure seasonal portable closet" as used herein refers only to a seasonal portable locker having (1) a width less than one meter and (2) at least one openable and lockable transport cavity larger than one cubic meter. The secure seasonal portable closet of FIG. 2 includes at least four posts 174A-D, an upper frame 174A, a lower frame 174B, and a covering 185 (e.g. one or more components of a sleeve assembly 285) thereof is configured to include at least one door 182 (e.g. one or more flaps 282 closable across a cargo port 249 thereof) that can be closed by one or more zippers 183 that can thereafter be locked. In some variants, for example, sleeve assembly 285 may be a (nylon or similarly) flexible single-piece sheet material in which one or more doors/flaps 282 are partly bounded by one or more (components of) zippers 183. Alternatively or additionally, sleeve assembly 285 may have one or more assembly port 248 configured to receive therethrough at least an upper portion 171 of each of the posts 173A-D. Alternatively or additionally, such ports 248 may be configured to receive a frame 174B or (a support of) a wheel 175 so as to engage the frame 174B.

Figure 3:
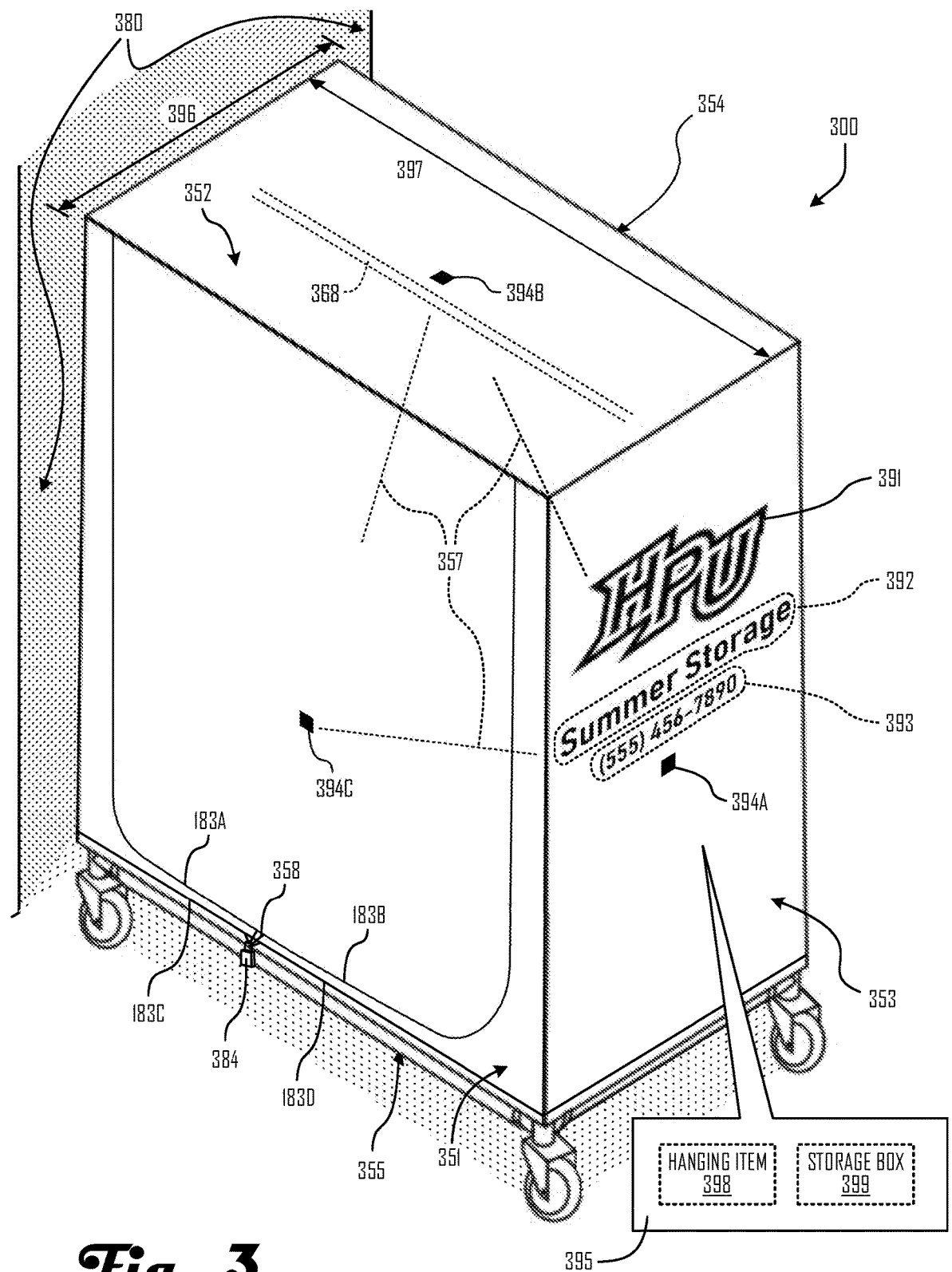
FIG. 3 illustrates another variant of a system configured to transport and store cargo in which one or more technologies may be implemented.

FIG. 3 depicts a secure seasonal storage system 300 configured to transport and store cargo 395 and including some or all features shown in FIG. 1 or FIG. 2 (or both). The portable locker 190 of FIG. 3 has an overall width 396 small enough to allow the closet to roll through a standard domestic doorway 380 and has a length 397 greater than its width 396. It also has at least one security covering 185 suitable to contain one or more storage boxes 399 as well as one or more hanging items 398 hanging from a wardrobe bar 368 therein. Security covering 185 includes one or more doors 182 (at least partly) bounded by one or more zippers 183A-B. Security covering 185 may also feature one or more assembly ports 248 (at least partly) bounded by one or more zippers 183C-D configured so that a single padlock, combination lock, or other lock 384 is configured to engage both (one or more sliders 358 of) the one or more zippers 183A-B bounding the one or more doors 182 and (one or more sliders 358 of) the one or more zippers 183C-D bounding assembly port 248 simultaneously. The security covering also includes one or more (instances of) institutional identifiers 391, seasonal service identifiers 392, contact information 393, and tags 394A-C on respective surfaces thereof. In some variants a tamper indication may be generated, for example, at least partly based on one or more estimate indications pertaining to a span 357 between tags 394A-C on respective walls changing enough to signal (apparent) damage to or disassembly of the security covering 185 (i.e. by an increase or decrease that exceeds a corresponding threshold). Increasing or decreasing by a factor of ten or more, for example, will be more than sufficient indication that secure seasonal storage system 300 has apparently been damaged. In some variants, for example, such spans can include Quick Response (QR) codes or other visually recognizable features, for example, such that one or more spans 357 may be estimated from a photograph that depicts both ends of a span 357.

Figure 4:
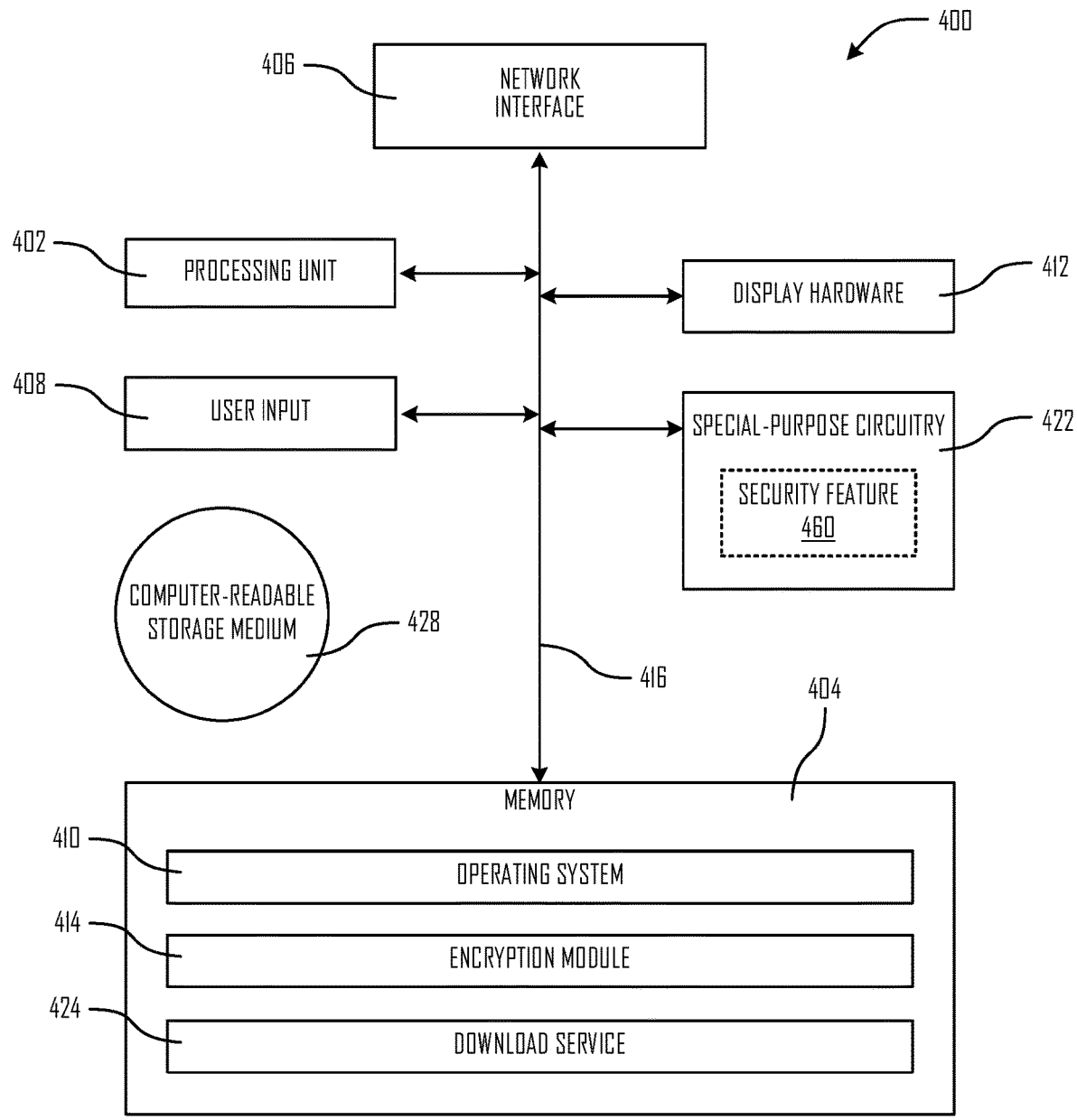
FIG. 4 illustrates a computing device configured to facilitate security in which one or more technologies may be implemented.

FIG. 4 illustrates several components of an exemplary computing device 400 (like those of FIG. 2, e.g.). As used herein, a plain reference numeral (like 400, e.g.) may refer generally to a member of a class of items (like client devices, e.g.) exemplified with a hybrid numeral (like 400A, e.g.) and it will be understood that every item identified with a hybrid numeral is also an exemplar of the class. In some embodiments, client device 400 may include many more components than those shown in FIG. 4. However, it is not necessary that all conventional components be shown in order to disclose an illustrative embodiment. As shown in FIG. 4, client device 400 includes a data network interface 406 (for connecting via the Internet or other networks to or within respective facilities 120A-B of FIG. 1, e.g.).

Client device 400 may also include one or more instances of processing units 402, memory 404, user inputs 408, and display hardware 412 all interconnected along with the network interface 406 via a bus 416. Memory 404 generally comprises a random access memory ("RAM"), a read only memory ("ROM"), and a permanent mass storage device, such as a disk drive.

Memory 404 may likewise contain one or more instances of operating systems 410, encryption modules 414, and download services 424 by which additional modules or other updates (of operational settings 131, e.g.) may be downloaded from a central facility 120A. This can occur, for example, in a context in which such devices 400 implement an Internet of Things (IoT) hub, for example, or a drone or handheld device. These and other digital components may be loaded from a non-transitory computer readable storage medium 418 into memory 404 of the client device 400 using a drive mechanism (not shown) associated with a non-transitory computer readable storage medium 418, such as a floppy disc, tape, DVD/CD-ROM drive, flash card, memory card, or the like. In some embodiments, digital components may also be loaded via the network interface 406, rather than via a computer readable storage medium 418. Special-purpose circuitry 422 may, in some variants, include some or all of the event-sequencing logic described below and one or more security features 460 (e.g. for preventing digital hacks or other such tampering with event recognition modules 130 or other event-sequencing logic described herein).

FIG. 15 depicts special-purpose transistor-based circuitry 1500—optionally implemented as an Application-Specific Integrated Circuit (ASIC) or in a UI governance server, e.g.—in which some or all of the functional modules described below may be implemented. Transistor-based circuitry 1500 comprises one or more instances of an event-sequencing structure generally as described in U.S. Pat. Pub. No. 20150094046 but configured as described herein. Transistor-based circuitry 1500 includes one or more instances of pattern recognition module 521, for example, each including an electrical node set upon which one or more (instances of) responses, identifiers, descriptions, alarms, or other informational indications 353 are represented digitally as a corresponding voltage configuration. Such modules 521-529 may include or otherwise interact with one or more cameras 152 or other sensors 536, moreover, or may implement a Global Positioning System (GPS) tracker 537 by which a mobile device may be located. Moreover one or more such modules may be configured to generate one or more Boolean indications 535 by compare quantified sensor data 125A-B or other indications 535 against one or more designer-defined thresholds 538A-B, all within the abilities of one of ordinary skill without any undue experimentation in light of teachings herein.

In the interest of concision and according to standard usage in information management technologies, the functional attributes of modules described herein are set forth in natural language expressions. It will be understood by those skilled in the art that such expressions (functions or acts recited in English, e.g.) adequately describe structures identified below so that no undue experimentation will be required for their implementation. For example, any records or other informational data identified herein may easily be represented digitally as a voltage configuration on one or more electrical nodes (conductive pads of an integrated circuit, e.g.) of an event-sequencing structure without any undue experimentation. Each electrical node is highly conductive, having a corresponding nominal voltage level that is spatially uniform generally throughout the node (within a device or local system as described herein, e.g.) at relevant times (at clock transitions, e.g.). Such nodes (lines on an integrated circuit or circuit board, e.g.) may each comprise a forked or other signal path adjacent one or more transistors. Moreover many Boolean values (yes-or-no decisions, e.g.) may each be manifested as either a "low" or "high" voltage, for example, according to a complementary metal-oxide-semiconductor (CMOS), emitter-coupled logic (ECL), or other common semiconductor configuration protocol. In some contexts, for example, one skilled in the art will recognize an "electrical node set" as used herein in reference to one or more electrically conductive nodes upon which a voltage configuration (of one voltage at each node, for example, with each voltage characterized as either high or low) manifests a yes/no decision or other digital data.

Transistor-based circuitry 1500 likewise includes one or more instances of tamper detection modules 522, availability determination modules 523, estimation modules 524, auditory pattern recognition modules 525, event-detection modules 526, speaker modules 527, (QR or other) symbol recognition modules 528, or transmission modules 529 (e.g. comprising one or more antennas and drivers) each including an electrical node set upon which informational data is represented digitally as a corresponding voltage configuration. In some variants, as described below in the clauses and claims, such a module implements such functionality jointly (in conjunction with other modules or processing units 402 described herein, e.g.). Alternatively or additionally, in some variants such modules (or components thereof) may be distributed (so that some are implemented in special-purpose circuitry 422 of respective devices 400, e.g.).

Figure 6:
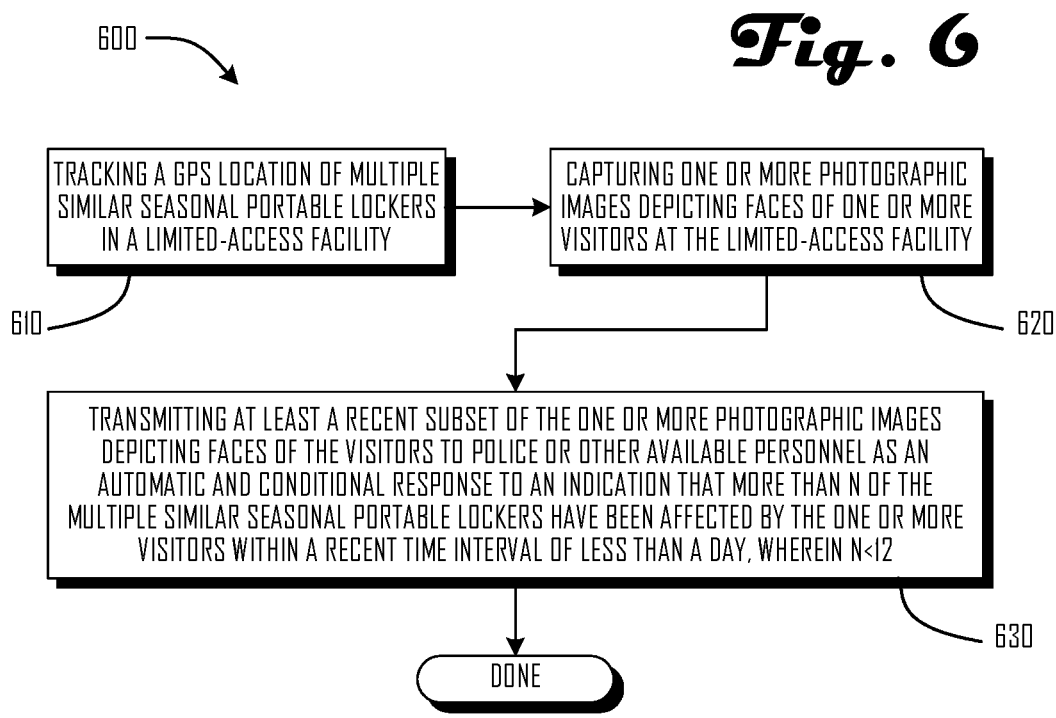
FIG. 6 illustrates an operational flow in which one or more technologies may be implemented.

FIG. 600 illustrates an operational flow 600 (implemented in software as a routine executed or coordinated by one or more instances of processing unit 402, e.g.) suitable for use with at least one embodiment, such as may be performed (in some variants) on a server or similar computing device 400 using special-purpose circuitry 422 (via a process flow management service thereof, e.g.). As will be recognized by those having ordinary skill in the art, not all events of information management are illustrated in FIG. 6. Rather, for clarity, only those steps reasonably relevant to describing the data handling aspects of flow 600 are shown and described. Those having ordinary skill in the art will also recognize the present embodiment is merely one exemplary embodiment and that variations on the present embodiment may be made without departing from the scope of the broader inventive concept set forth in the clauses and claims below.

Operation 610 describes tracking a GPS location of multiple similar seasonal portable lockers in a limited-access facility (e.g. one or more modules 521-529 receiving from each of several GPS trackers 537 coordinates of a location of each of such lockers 190 within facility 120B). This can occur, for example, in a context in which a larger group of such similar lockers 190 are all in a common vicinity 150 and able to provide camouflage to one another.

Operation 620 describes capturing one or more photographic images depicting faces of one or more visitors at the limited-access facility (e.g. the one or more modules 521-529 capturing an image or other identifying indication 535 depicting a face 119 of one or more visitors 118 at a facility 120B where the first and additional secure seasonal portable lockers 190 are deployed). This can occur, for example, in a context in which some modules include a security camera within cargo port 249, on a fixed-mount local device 400A (mounted on a ceiling, for example), or otherwise where a face 119 of a visitor 118 will be visible.

Operation 630 describes transmitting at least a recent subset of the one or more photographic images depicting faces of the visitors to police or other available personnel as an automatic and conditional response to an indication that more than N of the multiple similar seasonal portable lockers have been affected by the one or more visitors within a recent time interval of less than a day (e.g. the one or more modules 521-529 selectively transmitting a recent subset of the identifying indications 535 as an automatic and conditional response to an indication 535 that more than N of the first and several additional secure seasonal portable lockers have been adjusted within a recent time interval T, wherein N<12 and T is less than a day). This can occur, for example, in a context in which the recipient has expressed interest in receiving such information (e.g. by selecting an operational setting 131) and in which N has been set high enough, in a context of a given facility 120B, that such transmissions occur less often than once a week.

With respect to the numbered clauses and claims expressed below, those skilled in the art will appreciate that recited operations therein may generally be performed in any order. Also, although various operational flows are presented in a sequence(s), it should be understood that the various operations may be performed in other orders than those which are illustrated or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise. Also in the numbered clauses below, specific combinations of aspects and embodiments are articulated in a shorthand form such that (1) according to respective embodiments, for each instance in which a "component" or other such identifiers appear to be introduced (with "a" or "an," e.g.) more than once in a given chain of clauses, such designations may either identify the same entity or distinct entities; and (2) what might be called "dependent" clauses below may or may not incorporate, in respective embodiments, the features of "independent" clauses to which they refer or other features described above.

CLAUSES 1. (Independent) A secure seasonal storage system as shown in any one or more of FIGS. 1-5, comprising:
    a first secure seasonal portable closet or other secure seasonal portable locker 190 configured to roll through a standard domestic doorway 380 and having a length 397 greater than the width 396, wherein the first secure seasonal portable locker includes
    first, second, third, and fourth posts 173A-D;
    a first frame 174B (directly or otherwise) affixed to a lower portion 172 of each of the first, second, third, and fourth posts;
    a sleeve assembly 285 or other security covering 185 (directly or otherwise) supported by the first, second, third, and fourth posts 173A-D and by the first frame 174B; wherein the security covering 185 has one or more doors 182; wherein the security covering 185 contains one or more openable and lockable transport cavities 186 including a first transport cavity 186 larger than one cubic meter, one or more cargo ports 249 closable with at least one of the one or more doors 182 of the security covering 185; and wherein at least a first cargo port 249 of the one or more cargo ports 249 is larger than one square meter and configured to receive cargo 395 therethrough into the first transport cavity 186; and
    a plurality of wheels 175 (directly or otherwise) supporting the first frame 174B.

2. The system of any of the above CLAUSES, wherein the security covering 185 comprises:
    a single-piece sleeve assembly 285.

3. The system of any of the above CLAUSES, wherein the security covering 185 comprises:
    a single-piece sleeve assembly 285 that includes one or more cargo ports 249 each closable with a door 182, one or more assembly ports 148A-B each closable with another door 182, a front wall 351, a top wall 352, two end walls 353, a back wall 354, and a bottom wall 355.

4. The system of any of the above CLAUSES, wherein the security covering 185 comprises a single-piece sleeve assembly 285 that includes one or more zippers 183 bounding a flap 282 of the single-piece sleeve assembly 285.

5. The system of any of the above CLAUSES, wherein the security covering 185 comprises a single-piece sleeve assembly 285 that defines one or more openable and lockable transport cavities having an aggregate transport capacity larger than 1.2 cubic meters.

6. The system of any of the above CLAUSES, wherein the security covering 185 comprises a single-piece sleeve assembly 285 that defines one or more openable and lockable transport cavities including a first transport cavity 186 larger than one cubic meter, one or more cargo ports 249 closable with one or more doors 182 of the single-piece sleeve assembly 285, one or more assembly ports 148A-B closable with another one or more doors 182 of the single-piece sleeve assembly 285, a front wall 351, a top wall 352, two end walls 353, a back wall 354, and a bottom wall 355.

7. The system of any of the above CLAUSES, wherein the security covering 185 comprises a single-piece sleeve assembly 285 that defines one or more openable and lockable transport cavities including a first transport cavity 186 larger than one cubic meter, one or more cargo ports 249 closable with one or more doors 182 of the single-piece sleeve assembly 285, one or more assembly ports 148A-B closable with another one or more doors 182 of the single-piece sleeve assembly 285, a front wall 351, a top wall 352, two end walls 353, a back wall 354, and a bottom wall 355.

8. The system of any of the above CLAUSES, wherein the security covering 185 comprises a single-piece sleeve assembly 285 that defines one or more openable and lockable transport cavities including a first transport cavity 186 larger than one cubic meter, one or more cargo ports 249 closable with one or more doors 182 of the single-piece sleeve assembly 285, one or more assembly ports 148A-B closable with another one or more doors 182 of the single-piece sleeve assembly 285, a front wall 351, a top wall 352, two end walls 353, a back wall 354, and a bottom wall 355; and wherein each of the one or more doors 182 of the single-piece sleeve assembly 285 is a flap 282 bounded by one or more zippers 183A-D.

9. The system of any of the above CLAUSES, wherein the security covering 185 comprises a single-piece sleeve assembly 285 that contains one or more openable and lockable transport cavities including a first transport cavity 186 larger than one cubic meter, one or more cargo ports 249 closable with one or more doors 182 of the single-piece sleeve assembly 285, one or more assembly ports 148A-B closable with another one or more doors 182 of the single-piece sleeve assembly 285, a front wall 351, a top wall 352, two end walls 353, a back wall 354, and a bottom wall 355; wherein each of the one or more doors 182 of the single-piece sleeve assembly 285 is a flap 282 bounded by at least one of the one or more zippers 183A-D; and wherein at least one of the one or more cargo ports 249 of the single-piece sleeve assembly 285 is larger than one square meter and configured to receive cargo 395 therethrough into at least one of the one or more openable and lockable transport cavities 186 (e.g. to be hung on a wardrobe bar 368 therein).

10. The system of any of the above CLAUSES, wherein the security covering 185 comprises a single-piece sleeve assembly 285 that contains one or more openable and lockable transport cavities including a first transport cavity 186 larger than one cubic meter, one or more cargo ports 249 closable with one or more doors 182 of the single-piece sleeve assembly 285, one or more assembly ports 148A-B closable with another one or more doors 182 of the single-piece sleeve assembly 285, a front wall 351, a top wall 352, two end walls 353, a back wall 354, and a bottom wall 355; wherein each of the one or more doors 182 of the single-piece sleeve assembly 285 is a flap 282 bounded by at least one of the one or more zippers 183A-D; wherein at least one of the one or more cargo ports 249 of the single-piece sleeve assembly 285 is larger than one square meter and configured to receive cargo 395 therethrough into at least one of the one or more openable and lockable transport cavities 186 (e.g. to be hung on a wardrobe bar 368 therein); and wherein at least one of the one or more assembly ports 248 is smaller than the one of the one or more cargo ports 249 and is configured to receive therethrough at least an upper portion 171 of each of the first, second, third, and fourth posts 173A-D.

11. The system of any of the above CLAUSES, wherein the security covering 185 comprises a single-piece sleeve assembly 285 that defines one or more openable and lockable transport cavities including a first transport cavity 186 larger than one cubic meter, one or more cargo ports 249 closable with one or more doors 182 of the single-piece sleeve assembly 285, one or more assembly ports 148A-B closable with another one or more doors 182 of the single-piece sleeve assembly 285, a front wall 351, a top wall 352, two end walls 353, a back wall 354, and a bottom wall 355; wherein each of the one or more doors 182 of the single-piece sleeve assembly 285 is a flap 282 bounded by at least one of the one or more zippers 183A-D; wherein at least one of the one or more cargo ports 249 of the single-piece sleeve assembly 285 is larger than one square meter and configured to receive cargo 395 therethrough into at least one of the one or more openable and lockable transport cavities 186; wherein at least one of the one or more assembly ports 248 is smaller than the one of the one or more cargo ports 249 and is configured to receive therethrough at least an upper portion 171 of each of the first, second, third, and fourth posts 173A-D; and wherein the security covering 185 does not contain any other visual access features (such as windows or other openings, for example) larger than one square centimeter so that with the one or more cargo ports 249 (zipped closed or otherwise) secured no visual inspection (i.e. without an image magnifier or other artificial mechanism) inside the first seasonal portable locker 190 is possible without damaging the first seasonal portable locker 190.

12. The system of any of the above CLAUSES, comprising:
first transistor-based circuitry 188 configured to transmit a first wireless output 142 across a free space medium 146 in a local facility 120B, wherein the first wireless output 142 indicates a unique identity indication 535 (serial number or digital address, e.g.) of the first secure seasonal portable locker 190.

13. The system of any of the above CLAUSES, wherein the security covering 185 includes a front wall 351, a top wall 352, two end walls 353, a back wall 354, and a bottom wall 355; and wherein each of the walls comprise a flexible material (such as vinyl or fabric).

14. The system of any of the above CLAUSES, wherein the security covering 185 includes a front wall 351, a top wall 352, two end walls 353, a back wall 354, and a bottom wall 355; and wherein each of the walls comprise (at least some vinyl or other) synthetic polymer (wherein "some" means at least 20% by weight).

15. The system of any of the above CLAUSES, wherein the security covering 185 includes a front wall 351, a top wall 352, two end walls 353, a back wall 354, and a bottom wall 355; and wherein each of the walls comprise a rigid material (e.g. having a rigidity at least about equal to that of 1-millimeter-thick galvanized sheet metal). 16. The system of any of the above CLAUSES, wherein the security covering 185 includes a front wall 351, a top wall 352, two end walls 353, a back wall 354, and a bottom wall 355; and wherein each of the walls comprise (at least some) sheet metal.

17. The system of any of the above CLAUSES, wherein at least one cargo port 249 into the security covering 185 extends at least partway across the front wall 351.

18. The system of any of the above CLAUSES, comprising:
a second seasonal portable locker 190 within a local facility 120B where the first seasonal portable locker 190 is and configured so as to provide camouflage (as shown in FIG. 1) by being visually similar to the first secure seasonal portable locker 190 insofar that each of the first and second seasonal portable lockers 190 has a tag 394A on an end wall 153, 353 thereof on which an (alphanumeric serial number or other) identifying indication 535 is visible and less than 1 centimeter tall and in which the first and second seasonal portable lockers 190 are otherwise visually identical.

19. The system of any of the above CLAUSES, comprising:
a second seasonal portable locker 190 within a vicinity 150 of the first seasonal portable locker 190 and configured so as to provide camouflage (as shown in FIG. 1) by being visually similar to the first secure seasonal portable locker 190 insofar that each of the first and second seasonal portable lockers 190 has a tag 394A on an end wall 153, 353 thereof on which an (alphanumeric serial number or other) identifying indication 535 is visible and less than 1 centimeter tall and in which the first and second seasonal portable lockers 190 are otherwise visually identical.

20. The system of any of the above CLAUSES, comprising:
a paper or other individual tag 394 displaying a locker number, account number, name, phone number, or other identifying indication 535 mounted externally on the security covering 185 (in a slip pocket, for example).

21. The system of any of the above CLAUSES, wherein the security covering 185 includes a watertight top wall 352.

22. The system of any of the above CLAUSES, wherein the security covering 185 includes one or more doors 182 bounded around more than half of (a length of) a periphery thereof by one or more waterproof zippers 183A-B.

23. The system of any of the above CLAUSES, wherein more than half (by weight) of the security covering 185 is made of a waterproof or other water-resistant material (such as sheet metal or nylon, for example).

24. The system of any of the above CLAUSES, wherein the first secure seasonal portable locker 190 comprises one or more doors 182 that are bounded by and affixed to a single zipper 183, and wherein the security covering 185 does not include or engage any other zippers (whether or not it contains them in cargo 395).

25. The system of any of the above CLAUSES, wherein the first secure seasonal portable locker 190 comprises one or more doors 182 that are bounded by and affixed to a single zipper 183, wherein the security covering 185 does not include or engage any other zippers, and wherein the one or more doors 182 consist of a single flap 282.

26. The system of any of the above CLAUSES, comprising:
   a (facial or other) biometric pattern recognition module 521 in a vicinity 150 of the first secure seasonal portable locker 190 and configured to generate an (alert or other) irregularity-indicative output 142 as an automatic and conditional response to a comparison between an (auditory, photographic, or other) indication 535 identifying one or more (visitors 118 or other) prior users of the first secure seasonal portable locker 190 with an indication 535 identifying one or more (visitors 118 or other) current users of the first secure seasonal portable locker 190 (such as by module 521 comparing today's biometric data against that of a prior day) indicating one or more environmental irregularities in the vicinity 150 of the first secure seasonal portable locker 190.

27. The system of any of the above CLAUSES, wherein an exterior of the first secure seasonal portable locker 190 includes a (QR code or alphanumeric or other) printed identification tag 394, the system comprising:
   a smartphone, tablet, or similar handheld local module 400B including a symbol recognition module 528 configured to present a (photograph, name, or other) uniquely identifying indication 535 of (an owner or other person) who is authorized to access the first secure seasonal portable locker 190 as a real time response within 5 seconds of the symbol recognition module 528 capturing (via a camera 152 thereof) a photographic indication 535 from the printed identification tag 394 of the first secure seasonal portable locker 190.

28. The system of any of the above CLAUSES, comprising:
   an auditory pattern recognition module 521 configured to generate an (alert or other) irregularity-indicative output 142 as an automatic and conditional response to an auditory indication 535 from one or more sensors 536 in a vicinity 150 of the first secure seasonal portable locker 190 of one or more environmental irregularities (e.g. sounds of activity at odd hours or sounds of property damage or fighting anytime) in the vicinity 150 of the first secure seasonal portable locker 190.

29. The system of any of the above CLAUSES, comprising:
   one or more (cloud-based or other) servers 400 each at least partly residing at one or more offsite facilities 120A remote from the first secure seasonal portable locker 190, wherein the first secure seasonal portable locker includes a first portable GPS tracker 537, wherein one or more (cloud-based or other) servers 400 use output 142 via a cellular or GPS linkage 145 (or both) from the first portable GPS tracker 537 to maintain one or more historical indications 535 of where the first secure seasonal portable locker 190 was over time so that such historical indications cannot be affected by any physical destruction at the local facility 120B.

30. The system of any of the above CLAUSES, comprising:
   at least 11 additional secure seasonal portable lockers configured so as to provide camouflage by being visually similar to the first secure seasonal portable locker 190 (e.g. not having conspicuously different colors, patterns, or other ornamental customization features).

31. The system of any of the above CLAUSES, comprising:
   at least 11 additional seasonal portable lockers 190 configured in a vicinity 150 of the first secure seasonal portable locker 190 so as to provide camouflage to one another (as shown in FIG. 1) by being visually similar to the first secure seasonal portable locker 190 by each having a tag 394A on an end wall 153, 353 thereof on which an (alphanumeric serial number or other) identifying indication 535 is visible and less than 1 centimeter tall.

32. The system of any of the above CLAUSES, comprising:
   at least 11 additional seasonal portable lockers 190 configured so as to provide camouflage (as shown in FIG. 1) by being visually identical to the first secure seasonal portable locker 190, wherein the first secure seasonal portable locker 190 and the 11 additional seasonal portable lockers 190 are all arranged so that an end wall 153, 353 of each can be seen simultaneously from a single vantage point (e.g. that of onsite personnel 165 as shown in FIG. 1).

33. The system of any of the above CLAUSES, comprising:
   at least 11 additional seasonal portable lockers 190 configured in a vicinity 150 of the first secure seasonal portable locker 190 so as to provide camouflage to one another by being visually identical to the first secure seasonal portable locker 190, wherein the first secure seasonal portable locker 190 and the 11 additional seasonal portable lockers 190 are all serially arranged (e.g. front-to-back, front-to-front, or back-to-back) so that an end wall 153, 353 of each can be seen simultaneously from a single vantage point (e.g. that of onsite personnel 165 as shown in FIG. 1); wherein more than 75% of (a surface area of) the security covering 185 is (nominally) opaque; wherein each of the first and additional seasonal portable lockers 190 is visually indistinguishable from all of the others; and wherein each of the first and additional seasonal portable lockers 190 is effectively distinguishable from all of the others by one or more device-readable tags 394 on one or more end walls 153, 353 thereof (such as by having a QR code or RFID tag that includes a unique alphanumeric identifier, for example).

34. The system of any of the above CLAUSES, wherein the first secure seasonal portable locker 190 comprises only a single door 182 and only a single lock 184, 384.

35. The system of any of the above CLAUSES, wherein the first secure seasonal portable locker 190 comprises only a single door 182 and only a single lock 184, 384 (and no others affixed thereto).

36. The system of any of the above CLAUSES, wherein the first secure seasonal portable locker 190 comprises one or more doors 182; and wherein the one or more doors 182 include a flap 282 bounded by one or more zippers 183 configured so that a slider of each of the zippers engages a single padlock 284 (e.g. in common as shown in FIG. 3) when the flap 282 is locked closed.

37. The system of any of the above CLAUSES, wherein the first secure seasonal portable locker 190 comprises one or more doors 182; and wherein the one or more doors 182 include a flap 282 bounded by one or more zippers 183 configured so that a slider of each of the zippers engages a single combination lock 284 in common (e.g. as shown in FIG. 3) when the flap 282 is locked closed.

38. The system of any of the above CLAUSES, comprising a fixed-mount local module 400A installed at a local facility 120B containing the first secure seasonal portable locker 190 and containing an event detection module 526, wherein the event detection module 526 includes one or more components of second transistor-based circuitry 188 including a sensor 536 (e.g. a microphone 151 or camera 152) near the first seasonal portable locker 190.

39. The system of any of the above CLAUSES, comprising a (security drone or other) mobile local module 400B containing second transistor-based circuitry 188, wherein the mobile local module 400B resides at a local facility 120B containing the first secure seasonal portable locker 190.

40. The system of any of the above CLAUSES, comprising a fixed-mount local module 400A containing second transistor-based circuitry 188, wherein the fixed-mount local module 400A is installed at a local facility 120B containing the first secure seasonal portable locker 190.

41. The system of any of the above CLAUSES, comprising a fixed-mount local module 400A installed at a local facility 120B containing the first secure seasonal portable locker 190 and containing an event detection module 526 of the fixed-mount local module 400A installed at a local facility 120B, wherein the event detection module 526 includes one or more components of additional transistor-based circuitry 188 including a camera near the first seasonal portable locker 190.

42. The system of any of the above CLAUSES, wherein the transistor-based circuitry 188 includes an event detection module 526 including one or more cameras 152 or other sensors 536 near the first seasonal portable locker 190.

43. The system of any of the above CLAUSES, wherein the transistor-based circuitry 188 includes an event detection module 526 configured to generate a motion-indicative alarm indication 535 as an automatic and conditional response to detecting motion in a vicinity 150 of the first seasonal portable locker 190.

44. The system of any of the above CLAUSES, wherein the transistor-based circuitry 188 includes a tamper detection module 122 configured to generate a tampering-indicative alarm indication 535 at least partly based on sensor data 125B from a vicinity 150 of the first seasonal portable locker 190.

45. The system of any of the above CLAUSES, wherein the transistor-based circuitry 188 includes a tamper detection module 522 including one or more sensors 536 aboard the first seasonal portable locker 190.

46. The system of any of the above CLAUSES, wherein a second wireless (radio frequency or other) output 142 indicates a unique identity indication 535 (serial number or digital address, e.g.) of the first secure seasonal portable locker 190; and wherein at least one of the first or second wireless outputs 142 expresses a specific indication 535 of a location of the first secure seasonal portable locker 190 (a facility street address or GPS coordinates with a hall or floor number, for example).

47. The system of any of the above CLAUSES, comprising:
a wardrobe bar 368 that extends along more than half of a length 397 of the first secure seasonal portable locker 190 and under the second frame 174A.

48. The system of any of the above CLAUSES, wherein the first wireless output 142 is an automatic and conditional response at least partly based on a tamper detection module 181 (within local unit 400, for example) generating one or more tamper indications 535.

49. The system of any of the above CLAUSES, wherein the first wireless output 142 is an automatic and conditional response partly based on a tamper detection module 181 (within local unit 400, for example) generating one or more tamper indications 535 and partly based on an indication 535 that no onsite personnel 165 are apparently available (e.g. within a threshold 538A relating to one or more predicted time or distance estimate indication 535 from estimation module 524).

50. The system of any of the above CLAUSES, comprising a tamper detection module 122 configured to generate a first tamper indication 535 at least partly based on one or more estimate indications 535 (e.g. of a signal latency time or distance) pertaining to a span 357 between a pair of tags 394A-C crossing a threshold 538B indicative of damage to the first secure seasonal portable locker 190.

51. The system of any of the above CLAUSES, wherein the transistor-based circuitry 188 includes a transmission module 529 (e.g. including one or more antennas) configured to transmit a second wireless output 142 across a free space medium 146 as a real-time response to one or more events detected in a vicinity 150 of the first secure seasonal portable locker 190.

52. The system of any of the above CLAUSES, wherein the transistor-based circuitry 188 includes a transmission module 529 (e.g. including one or more antennas) configured to transmit a second wireless output 142 across a free space medium 146 in a local facility 120B, wherein the second wireless output 142 expresses a specific indication 535 of a location of the first secure seasonal portable locker 190 including at least one of a facility street address or GPS coordinates.

53. The system of any of the above CLAUSES, wherein the transistor-based circuitry 188 includes a transmission module 529 (e.g. including one or more antennas) configured to transmit a second wireless output 142 across a free space medium 146 in a local facility 120B, wherein the second wireless output 142 expresses a specific indication 535 of a location of the first secure seasonal portable locker 190 including GPS coordinates.

54. The system of any of the above CLAUSES, wherein the transistor-based circuitry 188 includes a transmission module 529 (e.g. including one or more antennas) configured to transmit a second wireless output 142 across a free space medium 146 in a local facility 120B, wherein the second wireless output 142 expresses a specific indication 535 of a location of the first secure seasonal portable locker 190 including a hall or floor number.

55. The system of any of the above CLAUSES, wherein the first wireless output 142 is an automatic and conditional response at least partly based on an indication 535 (e.g. from an availability determination module 523) that no onsite personnel 165 are apparently available (e.g. within a threshold 538A relating to one or more predicted time or distance estimate indications 535 from estimation module 524).

56. The system of any of the above CLAUSES, wherein the first wireless output 142 includes an audible onsite alarm indication 535 (e.g. from speaker module 522).

57. The system of any of the above CLAUSES, wherein the first wireless output 142 indicates the unique identity indication 535 (serial number or digital address, e.g.) of the first secure seasonal portable locker 190 as a real-time response to one or more events (e.g. receiving a wireless query signal) detected in or on the first secure seasonal portable locker 190.

58. The system of any of the above CLAUSES, wherein the security covering 185 includes one or more doors 182 and one or more locks 184 configured to secure the one or more doors 182 against unauthorized access.

59. The system of any of the above CLAUSES, wherein a transport cavity 186 of the one or more openable and lockable transport cavities 186 is larger than one cubic meter.

60. The system of any of the above CLAUSES, comprising a second frame 174A (directly or otherwise) supported by an upper portion 171 of each of the first, second, third, and fourth posts 173A-D.

61. The system of any of the above CLAUSES, wherein the first secure seasonal portable locker 190 is configured to have a width 396 of at most 85 centimeters so as to be narrow enough to roll through any standard domestic doorway.

62. The system of any of the above CLAUSES, wherein the first secure seasonal portable locker 190 includes a wardrobe bar 368 supporting a hanging item 398, wherein the hanging item 398 is a padded bag containing one or more breakable dishes.

63. The system of any of the above CLAUSES, wherein the first secure seasonal portable locker 190 includes a wardrobe bar 368 supporting a hanging item 398, wherein the hanging item 398 includes a hanging shelf.

64. The system of any of the above CLAUSES, wherein the first secure seasonal portable locker 190 includes a wardrobe bar 368 supporting a hanging item 398 comprising a bag containing shoes.

65. The system of any of the above CLAUSES, wherein the first secure seasonal portable locker 190 includes a wardrobe bar 368 supporting a hanging item 398 comprising a bag containing one or more vertical art works.

66. The system of any of the above CLAUSES, wherein the first secure seasonal portable locker 190 contains and protects at least one box 399 therein from theft.

67. The system of any of the above CLAUSES, wherein the first secure seasonal portable locker 190 includes a wardrobe bar 368 and contains a wearable hanging item 398 (such as a long dress or winter coat) supported by the wardrobe bar 368 and protects same from theft.

68. The system of any of the above CLAUSES, comprising:
  a wardrobe bar 368 configured to support one or more wearable hanging items 398 within (a transport cavity of) the first secure seasonal portable locker 190.

69. The system of any of the above CLAUSES, comprising:
  at least 11 additional seasonal portable lockers 190 configured so as to be visually identical to the first secure seasonal portable locker 190, wherein the first secure seasonal portable locker 190 and the 11 additional seasonal portable lockers 190 are all arranged so that an end wall 153, 353 of each can be seen simultaneously from a single vantage point (e.g. that of onsite personnel 165 as shown in FIG. 1).

70. The system of any of the above CLAUSES, comprising:
  at least 11 additional seasonal portable lockers 190 configured so as to be visually identical to the first secure seasonal portable locker 190; wherein more than 75% of (an exterior surface area of) the security covering 185 is (nominally) opaque; wherein each of the first and additional seasonal portable lockers 190 is visually indistinguishable from all of the others; but wherein each of the first and additional seasonal portable lockers 190 is effectively distinguishable from all of the others by one or more device-readable tags 394 on one or more end walls 153, 353 thereof (such as by having a QR code or RFID tag that includes a unique alphanumeric identifier, for example).

71. The system of any of the above CLAUSES, wherein more than half of an exterior of the security covering is opaque.

72. The system of any of the above CLAUSES, wherein the security covering includes an end wall 153, 353 having a logo, acronym, or other institutional identifier 391 printed thereon.

73. The system of any of the above CLAUSES, wherein the security covering includes an end wall 153, 353 having a seasonal service identifier 392 printed thereon.

74. The system of any of the above CLAUSES, wherein the security covering includes an end wall 153, 353 having a phone number or other contact information 393 printed thereon.

75. The system of any of the above CLAUSES, wherein the security covering includes an end wall 153, 353 having a tag 394A affixed thereto.

76. The system of any of the above CLAUSES, wherein the security covering includes a front flap 282 or other front door 182 having a logo, acronym, or other institutional identifier 391 printed thereon.

77. The system of any of the above CLAUSES, wherein the security covering includes a front flap 282 or other front door 182 having a seasonal service identifier 392 printed thereon.

78. The system of any of the above CLAUSES, wherein the security covering includes a top wall 352 having a tag 394B affixed thereto.

79. The system of any of the above CLAUSES, wherein the security covering includes a front flap 282 or other front door 182 having a phone number or other contact information 393 printed thereon.

80. The system of any of the above CLAUSES, wherein the security covering includes a front flap 282 or other front door 182 having a tag 394C affixed thereto.

81. The system of any of the above CLAUSES, wherein the security covering includes a bottom wall 355 having a tag 394 affixed thereto.

82. A method comprising steps of configuring a system of any of the above SYSTEM CLAUSES as described herein.

83. A method comprising steps of using a system of any of the above SYSTEM CLAUSES as described herein.

84. The method of either of the above METHOD CLAUSES, comprising:
  configuring the first secure seasonal portable locker 190 and at least 11 additional secure seasonal portable lockers 190 each to have a Global Positioning System (GPS) tracker 537 aboard;
  receiving from each of the GPS trackers 537 a GPS location of each of the first and additional secure seasonal portable lockers 190;
  capturing an (image or other) identifying indication 535 depicting (a face 119, badge number, or other feature of) one or more visitors 118 at a facility 120B where the first and additional secure seasonal portable lockers 190 are deployed; and selectively transmitting a recent subset of the identifying indications 535 (i.e. including at least one newer indication 535 in preference to at least one older indication 535 as indicated by timestamps or similar age indications 535) depicting the one or more visitors 118 at the facility 120B where the first and additional secure seasonal portable lockers 190 are deployed (such as to current lessees of the first and additional secure seasonal portable lockers 190, police, or other onsite or offsite personnel 165) as an automatic and conditional response to an indication 535 that more than N of the first and several additional secure seasonal portable lockers have been (moved or tampered with or otherwise apparently) adjusted by the one or more visitors within a recent time interval T; and wherein N<12 and T is less than a day.

85. The method of CLAUSE 84, wherein N and T are each a management-defined operational setting 131 (e.g. of system 100).

86. The method of CLAUSE 84, wherein 1<N<12 and wherein the indication 535 that more than N of the first and additional secure seasonal portable lockers have been adjusted by the one or more visitors within a recent time interval T consists of an indication 535 that the first secure seasonal portable locker 190 was moved.

87. The method of CLAUSE 84, wherein N=0 and wherein the indication 535 that more than N of the first and additional secure seasonal portable lockers have been adjusted by the one or more visitors within a recent time interval T consists of an indication 535 that the first secure seasonal portable locker 190 was tampered with.

88. The method of any of the above METHOD CLAUSES, comprising:

configuring the additional seasonal portable lockers so as to be visually identical to the first secure seasonal portable locker; and arranging the first secure seasonal portable locker and the 11 additional seasonal portable lockers so that an end wall 153, 353 of each can be seen simultaneously from a single vantage point.

While various system, method, article of manufacture, or other embodiments or aspects have been disclosed above, also, other combinations of embodiments or aspects will be apparent to those skilled in the art in view of the above disclosure. The various embodiments and aspects disclosed above are for purposes of illustration and are not intended to be limiting, with the true scope and spirit being indicated in the final claim set that follows.

What is claimed is:

1. A secure seasonal storage system, comprising:
a first secure seasonal portable locker configured to have a width of at most 85 centimeters so as to be narrow enough to roll through any standard domestic doorway and having a length greater than said width, wherein said first secure seasonal portable locker is a first secure seasonal portable closet that includes first, second, third, and fourth posts;

a first frame affixed to a lower portion of each of said first, second, third, and fourth posts;

a second frame supported by an upper portion of each of said first, second, third, and fourth posts;

a security covering supported by said first, second, third, and fourth posts and by said first and second frames; wherein said security covering comprises a sleeve assembly having one or more doors; wherein said security covering contains one or more openable and lockable transport cavities having an aggregate transport capacity larger than 1.2 cubic meters including a first transport cavity larger than one cubic meter, one or more cargo ports closable with at least one of said one or more doors of said security covering, one or more assembly ports closable with another one or more doors of said security covering, a front wall, a top wall, two end walls, a back wall, and a bottom wall; wherein each of said one or more doors of said sleeve assembly is a flap bounded by one or more zippers; wherein at least a first cargo port of said one or more cargo ports of said sleeve assembly is larger than one square meter and configured to receive cargo therethrough into at least one of said one or more openable and lockable transport cavities; wherein at least one of said one or more assembly ports is smaller than said first cargo port and is configured to receive therethrough at least an upper portion of each of said first, second, third, and fourth posts; and wherein said security covering does not contain any other visual access features larger than one square centimeter so that with said one or more cargo ports secured no visual inspection inside said first transport cavity is possible without damaging said first seasonal portable closet;

a plurality of wheels supporting said first and second frames; and a biometric recognition module configured to generate an irregularity-indicative output as an automatic and conditional response to a comparison between an indication identifying one or more prior users of said first secure seasonal portable closet with an indication identifying one or more current users of said first secure seasonal portable closet indicating one or more environmental irregularities in a vicinity of said first secure seasonal portable closet.

2. The secure seasonal storage system of claim 1, wherein said first secure seasonal portable closet contains and protects at least one wearable hanging item hanging from a wardrobe bar within said first transport cavity.

3. The secure seasonal storage system of claim 1, comprising:

one or more servers each at least partly residing at one or more offsite facilities remote from said first secure seasonal portable closet, wherein said first secure seasonal portable closet includes a first portable Global Positioning System (GPS) tracker, wherein one or more servers use output from said first portable GPS tracker to maintain one or more historical indications of where said first secure seasonal portable closet was over time so that such historical indications cannot be affected by any physical destruction at said local facility.

4. The secure seasonal storage system of claim 1, wherein said transistor-based circuitry of said first secure seasonal portable closet includes an event detection module including or interacting with one or more sensors in, on, or near said first secure seasonal portable closet configured to generate a motion-indicative indication as an automatic and conditional response to detecting motion of or in a vicinity of said first secure seasonal portable closet; and wherein a tamper detection module including one or more sensors aboard said first secure seasonal portable closet is configured to generate a tamper indication at said first secure seasonal portable closet.

5. The secure seasonal storage system of claim 1, comprising:
   at least 11 additional secure seasonal portable closets configured so as to provide camouflage to said first secure seasonal portable closet, wherein said first secure seasonal portable closet and said 11 additional secure seasonal portable closets are all arranged so that an end wall of each can be seen simultaneously from a single vantage point; and wherein each of said first and additional secure seasonal portable closets is effectively distinguishable from all of said others by one or more device-readable tags thereof.

6. The secure seasonal storage system of claim 1, wherein said one or more zippers are configured so that a slider of each of said one or more zippers engages a single lock in common, wherein said single lock is a padlock or a combination lock.

7. The secure seasonal storage system of claim 1, comprising a local module containing other transistor-based circuitry including an event detection module including a camera configured to photograph said first secure seasonal portable closet as an automatic and conditional response to a motion indication.

8. The secure seasonal storage system of claim 1, comprising a local module containing other transistor-based circuitry including an event detection module including a camera configured to photograph said first secure seasonal portable closet as an automatic and conditional response to a tamper indication.

9. The secure seasonal storage system of claim 1, comprising:
   one or more tamper detection modules configured to detect a tamper indication affecting said first secure seasonal portable closet in real time, wherein said one or more tamper detection modules include one or more sensors aboard said first secure seasonal portable closet.

10. The secure seasonal storage system of claim 1, wherein a second wireless real time output indicates a unique identity indication of said first secure seasonal portable closet; and wherein at least one of said first or second wireless real time outputs expresses a specific indication of a location of said first secure seasonal portable closet.

11. The secure seasonal storage system of claim 1, wherein said security covering includes a front wall, a top wall, two end walls, a back wall, and a bottom wall; wherein said security covering contains a primary opening; wherein said security covering is configured not to contain any other visual access features larger than one square centimeter so that no visual inspection inside said first secure seasonal portable closet is possible without damaging said first secure seasonal portable closet or accessing said primary opening.

12. The secure seasonal storage system of claim 1, wherein said security covering includes a front wall, a top wall, two end walls, a back wall, and a bottom wall; and wherein each of said walls comprise synthetic polymer.

13. The secure seasonal storage system of claim 1, comprising:
   a smartphone, tablet, or similar handheld device including a symbol recognition module configured to present a uniquely identifying indication of who is authorized to access said first secure seasonal portable closet as a real time response within 5 seconds of said symbol recognition module capturing a photographic indication received from a printed identification tag on an exterior of said first secure seasonal portable closet.

14. The secure seasonal storage system of claim 1, wherein said first wireless real time output includes an audible onsite alarm indication from speaker module as an automatic and conditional response at least partly based on a tamper detection module.

* * * * *